(12) United States Patent
Newman

(10) Patent No.: US 12,279,044 B1
(45) Date of Patent: Apr. 15, 2025

(54) SYSTEMS AND METHODS FOR GENERATING DISTANCE-LAPSE VIDEOS

(71) Applicant: GoPro, Inc., San Mateo, CA (US)

(72) Inventor: David Newman, Del Mar, CA (US)

(73) Assignee: GoPro, Inc., San Mateo, CA (US)

( * ) Notice: Subject to any disclaimer, the term of this patent is extended or adjusted under 35 U.S.C. 154(b) by 116 days.

(21) Appl. No.: 18/308,154

(22) Filed: Apr. 27, 2023

(51) Int. Cl.
*H04N 5/335* (2011.01)
*H04N 23/51* (2023.01)
*H04N 23/695* (2023.01)

(52) U.S. Cl.
CPC ........... *H04N 23/695* (2023.01); *H04N 23/51* (2023.01)

(58) Field of Classification Search
CPC .................................................. H04N 23/695
See application file for complete search history.

(56) References Cited

U.S. PATENT DOCUMENTS

| | | | |
|---|---|---|---|
| 2005/0046706 A1* | 3/2005 | Sesek | H04N 5/772 386/E5.072 |
| 2011/0102637 A1* | 5/2011 | Lasseson | G01C 21/3647 348/E5.051 |
| 2016/0021332 A1* | 1/2016 | Hines | H04N 9/8205 386/201 |
| 2017/0028935 A1* | 2/2017 | Dutta | H04N 21/6181 |
| 2017/0206935 A1* | 7/2017 | Li | H04N 5/2621 |
| 2018/0013976 A1* | 1/2018 | Rios | H04N 5/77 |
| 2019/0373256 A1* | 12/2019 | Yuan | H04N 19/134 |
| 2020/0073520 A1* | 3/2020 | Mohan | G06Q 30/0235 |
| 2022/0319320 A1* | 10/2022 | Nakano | G01C 21/3602 |

* cited by examiner

*Primary Examiner* — Gary C Vieaux
(74) *Attorney, Agent, or Firm* — Esplin & Associates, PC

(57) ABSTRACT

An image capture device may be moved while capturing a distance-lapse video. Distance traveled by the image capture device may be used to determine when video frames of the distance-lapse video are generated. Video frames of the distance-lapse video may be generated when the image capture device travels over a certain amount of distance. Distance interval, rather than time interval, may be used to generate the distance-lapse video.

20 Claims, 6 Drawing Sheets

SYSTEMS AND METHODS FOR GENERATING DISTANCE-LAPSE VIDEOS

FIELD

This disclosure relates to generating distance-lapse videos using distance traveled by an image capture device.

BACKGROUND

A time-lapse video may provide a sped-up view of captured images. An image capture device moving at different speeds while capturing the time-lapse video may result in the video appearing too fast in some parts and appearing too slow other parts.

SUMMARY

This disclosure relates to generating videos using traveled distance. An image capture device may include one or more of an image sensor, an optical element, a location sensor, a processor, and/or other components. The image sensor may generate a visual output signal conveying visual information based on light that becomes incident thereon. The visual information may define visual content. The optical element may guide light within a field of view to the image sensor. The location sensor may generate a location output signal conveying location information. The location information may characterize location of the image capture device.

A distance traveled by the image capture device may be determined based on the location information and/or other information. Whether the distance traveled by the image capture device satisfies a distance criterion may be determined. Responsive to determination that the distance traveled by the image capture device satisfies the distance criterion, a video frame of a distance-lapse video may be generated based on the visual content and/or other information.

A housing may carry one or more components of the image capture device. The housing may carry (be attached to, support, hold, and/or otherwise carry) one or more of an electronic storage, an image sensor, an optical element, a location sensor, a processor, and/or other components.

The electronic storage may store information relating to an image capture device, visual information, information relating to visual content, information relating to optical element, information relating to field of view, location information, information relating to location of the image capture device, information relating to distance traveled by the image capture device, information relating to video frames, information relating to a distance-lapse video, and/or other information.

The image sensor may be configured to generate a visual output signal and/or other output signals. The visual output signal may convey visual information based on light that becomes incident on the image sensor and/or other information. The visual information may define visual content.

The optical element may be configured to guide light within a field of view to the image sensor. The field of view may have a size. The field of view may be less than 180 degrees. The field of view may be equal to 180 degrees. The field of view may be greater than 180 degrees.

The location sensor may be configured to generate a location output signal and/or other output signals. The location output signal may convey location information of the image capture device. The location information may characterize location of the image capture device. In some implementations, the location sensor may include a Global Positioning System (GPS) sensor and/or other location sensor.

The processor(s) may be configured by machine-readable instructions. Executing the machine-readable instructions may cause the processor(s) to facilitate generating videos using traveled distance. The machine-readable instructions may include one or more computer program components. The computer program components may include one or more of a distance component, a distance criterion component, a generation component, and/or other computer program components.

The distance component may be configured to determine a distance traveled by the image capture device. The distance traveled by the image capture device may be determined based on the location information and/or other information.

In some implementations, the distance traveled by the image capture device may include a change in latitude and/or longitude of the image capture device. The distance traveled by the image capture device may further include a change in elevation of the image capture device.

In some implementations, determination of the distance traveled by the image capture device based on the location information may include: determination of a first location of the image capture device based on the location of the image capture device characterized by the location information at a first moment and/or other information; determination of a second location of the image capture device based on the location of the image capture device characterized by the location information at a second moment and/or other information; and determination of the distance traveled by the image capture device based on a difference between the first location of the image capture device and the second location of the image capture device and/or other information.

In some implementations, determination of the distance traveled by the image capture device based on the location information may include: determination of a path traveled by the image capture device over a capture duration based on the location of the image capture device characterized by the location information at multiple moments within the capture duration and/or other information; and determination of the distance traveled by the image capture device based on the path traveled by the image capture device and/or other information.

The distance criterion component may be configured to determine whether the distance traveled by the image capture device satisfies a distance criterion. In some implementations, the distance criterion may include a first criterion for the change in latitude and/or longitude of the image capture device, a second criterion for the change in elevation of the image capture device, and/or other criteria.

The generation component may be configured to, responsive to determination that the distance traveled by the image capture device satisfies the distance criterion, generate one or more video frames of a distance-lapse video based on the visual content and/or other information. In some implementations, generation of a video frame of the distance-lapse video may include capture of the video frame for inclusion in the distance-lapse video. In some implementations, generation of a video frame of the distance-lapse video may include selection of the video frame from captured video frames for inclusion in the distance-lapse video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
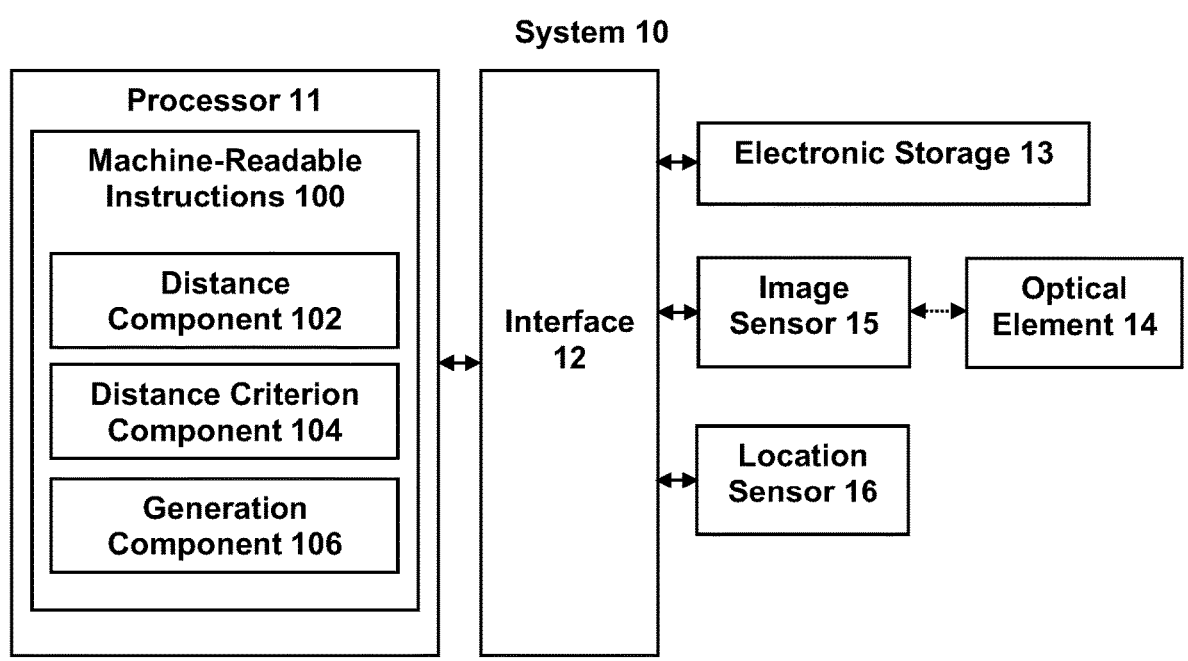
FIG. 1 illustrates an example system for generating videos using traveled distance.

FIG. 1 illustrates a system 10 for generating videos using traveled distance. The system 10 may include one or more of a processor 11, an interface 12 (e.g., bus, wireless interface), an electronic storage 13, an optical element 14, an image sensor 15, a location sensor 16, and/or other components. The system 10 may include and/or be part of an image capture device. The image capture device may include a housing, and one or more of the optical element 14, the image sensor 15, the location sensor 16, and/or other components of the system 10 may be carried by the housing the image capture device. The optical element 14 may guide light within a field of view to the image sensor 15. The image sensor 15 may generate a visual output signal conveying visual information based on light that becomes incident thereon. The visual information may define visual content. The location sensor 16 may generate a location output signal conveying location information. The location information may characterize location of the image capture device.

A distance traveled by the image capture device may be determined by the processor 11 based on the location information and/or other information. Whether the distance traveled by the image capture device satisfies a distance criterion may be determined by the processor 11. Responsive to determination that the distance traveled by the image capture device satisfies the distance criterion, a video frame of a distance-lapse video may be generated by the processor 11 based on the visual content and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to an image capture device, visual information, information relating to visual content, information relating to optical element, information relating to field of view, location information, information relating to location of the image capture device, information relating to distance traveled by the image capture device, information relating to video frames, information relating to a distance-lapse video, and/or other information Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors. As used herein, the term video frame may refer to an image or a photograph.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the optical element 14, the image sensor 15, and/or the location sensor 16 of the system 10 may be carried by the housing of the image capture device. The housing of the image capture device may carry other components of the system 10, such as the processor 11 and/or the electronic storage 13. References to a housing of an image capture device may refer to the image capture device, and vice versa. For example, references to location of a housing of an image capture device may refer to location of the image capture device, and vice versa.

Figure 3:
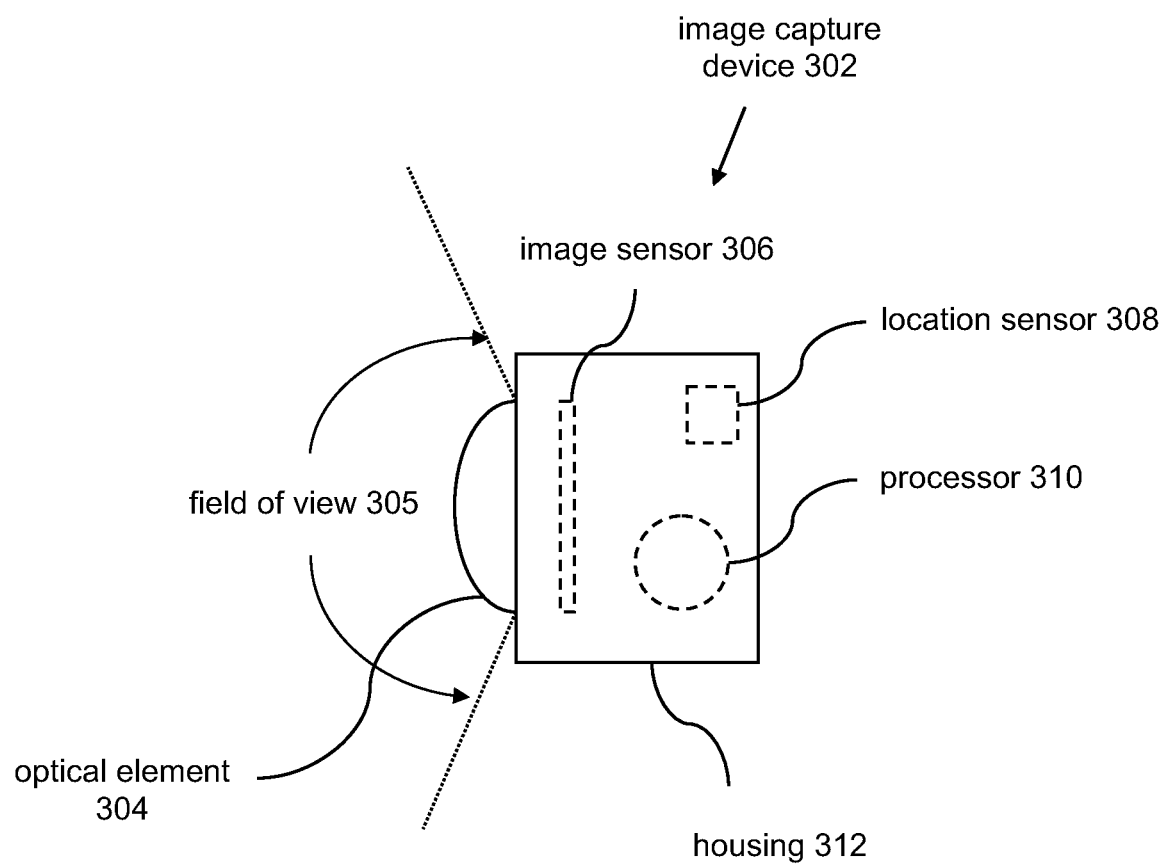
FIG. 3 illustrates an example image capture device.

An image capture device may refer to a device captures visual content. An image capture device may capture visual content in form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet). FIG. 3 illustrates an example image capture device 302. Visual content (e.g., of image(s), video frame(s)) may be captured by the image capture device 302. The image capture device 302 may include a housing 312. The housing 312 may refer a device (e.g., casing, shell) that covers, protects, and/or supports one or more components of the image capture device 302. The housing 312 may include a single-piece housing or a multi-piece housing. The housing 312 may carry (be attached to, support, hold, and/or otherwise carry) one or more of an optical element 304, an image sensor 306, a location sensor 308, a processor 310, and/or other components of the image capture device 302.

One or more components of the image capture device 302 may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15. The location sensor 308 may be the same as, be similar to, and/or correspond to the location sensor 16. The housing may carry other components, such as the electronic storage 13. The image capture device 302 may include other components not shown in FIG. 3. The image capture device 302 may not include one or more components shown in FIG. 3. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

The field of view 305 may be larger than a size of the punchout/viewing window used to generate video frames of a distance-lapse video. For example, a punchout/viewing window within the visual content may be used to stabilize visual content captured by the image capture device 302 and the stabilized visual content may be included within the video frames. Stabilization of visual content may include reduction, removal, and/or smoothing of motion present in the visual content due to motion (e.g., mechanical displacement, rotational motion, translational motion) of the image capture device 302 during visual content capture. Motion of the image capture device 302 during visual content capture may result in motion within the captured visual content. For example, shaking of the image capture device 302 during visual content capture may result in shaky motion within the captured visual content. Such motion within the visual content may be unintentional and/or not be desirable.

Portions of the visual content captured from light within the field of view 305 may be presented on a display and/or used to generate video frames. The portions of the visual content presented on the display/used to generate video frames may include those portions of the visual content within a viewing window. A viewing window may define extents of the visual content (e.g., of image(s)/video frame(s)) to be included within a punchout. The viewing window may be determined so that the visual content within the presentation/video frames do not include motion, include less motion, or include smoother motion than the visual content. For instance, the visual content may include shaky/jerky footage due to motion of the image capture device 302 during visual content capture, and the viewing window may be determined so that the portion of the visual content that is presented/used for video frame generation does not appear shaky/jerky or appears less shaky/jerky. For example, the shape, size, and/or the location of the viewing window within the visual content may be determined to compensate for motion of the image capture device 302 during capture such that the video frames appear to have been captured from an image capture device 302 with less/smoother motion. That is, the visual content captured by the image capture device 302 may be cropped to generate video frames that are stabilized. In some implementations, the viewing window may be shaped and/or sized to provide a panoramic punchout of the visual content.

A panoramic punchout of the visual content may have a panoramic field of view. A panoramic field of view may include a wide field of view, a tall field of view, and/or other field of view. A panoramic field of view may include one dimensional field of view (e.g., visible extent in one direction) that is at least as twice as large as another dimensional field of view (e.g., visible extent in perpendicular direction). For example, a wide field of view may have a horizontal field of view that is at least as twice as large as a vertical field of view (aspect ratio of at least 2:1). A tall field of view (e.g., to create vertoramas) may have a vertical field of view that is at least as twice as large as a horizontal field of view (aspect ratio of 1:2 or less). Other aspect ratios of panoramic field of view are contemplated.

For example, the panoramic field of view of the viewing window may include a ninety-degree (or less) vertical field of view and a two-hundred seventy-degree horizontal field of view. Usage of such panoramic field of view may enable presentation/extraction of a wide view depicted within the visual content. In some implementations, the panoramic field of view may be determined based on user input and/or other information. For example, a user may be provided with one or more options to select the panoramic field of view (e.g., horizontal panorama option, vertical panorama option, custom panorama option), and the panoramic field of view may be determined based on the option(s) selected by the user. Other rotations and degrees of panoramic field of view are contemplated.

In some implementations, the image capture device 302 may include multiple optical elements. For example, the image capture device 302 may include multiple optical elements that are arranged on the housing 312 to capture spherical images/videos (guide light within spherical field of view to one or more images sensors). For instance, the image capture device 302 may include two optical elements positioned on opposing sides of the housing 312. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 302 may include multiple image sensors. For example, the image capture device 302 may include multiple image sensors carried by the housing 312 to capture spherical images/videos based on light guided thereto by multiple optical elements. For instance, the image capture device 302 may include two image sensors configured to receive light from two optical elements positioned on opposing sides of the housing 312. The fields of views of the optical elements may overlap and enable capture of spherical images and/or spherical videos.

The location sensor 308 may include sensor(s) that measures location. The location sensor 308 may convert experienced locations into output signals. The output signals may include electrical signals. The location sensor 308 may include one or more Global Positioning System (GPS) sensors and/or other location sensor(s). For instance, the location sensor 308 may include one or more GPS receivers that communicate with GPS satellites. The location sensor 310 may generate output signals conveying information that characterizes location of the location sensor 308 and/or device(s) carrying the location sensor 308, such as the image capture device 302 and/or the housing 312. The location measured by the location sensor 308 may include latitude and/or longitude position of the image capture device 302. The location measured by the location sensor 308 may further include elevation of the image capture device 302.

For example, the location sensor 308 may be configured to generate a location output signal based on position of the location sensor 308 on Earth and/or communication with other device(s) (e.g., communication with GPS devices). The location output signal may convey location information of the image capture device 302. The location information may characterize location of the image capture device 302 at different moments (points in time, time durations) within the capture duration.

The location information may characterize location of the image capture device 302 by including information that characterizes one or more content, qualities, attributes, features, and/or other aspects of the location of the image capture device. For example, the location information may characterize location of the image capture device by including information that specifies longitude and latitude coordinates/GPS coordinates of the image capture device. The location information may characterize location of the image capture device by including information from which longitude and latitude coordinates/GPS coordinates of the image capture device may be determined. The location information may characterize location of the image capture device by including information that specifies elevation of the image capture device. The location information may characterize location of the image capture device by including information from which elevation of the image capture device may be determined. Other types of location information are contemplated.

The processor 310 may include one or more processors (logic circuitry) that provide information processing capabilities in the image capture device 302. The processor 310 may provide one or more computing functions for the image capture device 302. The processor 310 may operate/send command signals to one or more components of the image capture device 302 to operate the image capture device 302. For example, the processor 310 may facilitate operation of the image capture device 302 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from the location sensor 308 and/or facilitate transfer of information from the location sensor 308 to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

A time-lapse video may be captured to show a footage that plays faster than real speed. A time-lapse video may be generated by capturing video frames at a rate that is slower than the rate at which the video is played (e.g., capturing a video frame every minute for playback at 30 frames per second). However, such time-based capture of video frames may result in erratic footage if the image capture device is moving at different speeds during video capture. For example, an image capture device may be used to capture a time-lapse video while mounted on a vehicle. Time-based capture of video frames may result in too many video frames being captured when the vehicle/image capture device is not moving/moving slowly and too few video frames being captured when the vehicle/image capture device is moving/moving fast.

Rather than using time interval to "compress" time in the time-lapse video, distance traveled by the image capture device may be used to compress time in a distance-lapse video. A distance-lapse video may refer to a video in which video frames are generated based on distance traveled by the image capture device. A distance-lapse video may refer to a video in which distance interval, rather than time interval, is used to generate video frames. A distance-lapse video may refer to a video in which time is "compressed" using distance-interval, rather than time-interval. A distance-lapse video may refer to a video in which distances between positions of the image capture device at different moments may be used to control video frame generation. In some implementations, a distance-lapse video may be generated for photogrammetry capture.

Such generation of the video frames may result in the distance-lapse video showing motion with constant speed. For instance, going back to the example of image capture device mounted on a vehicle, the vehicle may travel on a road and may, from time to time, pause at traffic lights. A distance-lapse video may generate video frames based on actual distance traveled by the image capture device so that the distance-lapse video does not show pauses at traffic lights. Use of the distance traveled by the image capture device to generate video frames may also provide the benefit of avoiding/reducing redundant video frames in the distance-lapse video. Because video frames are generated based on image capture device movement, video frames may tend to include views from different locations, and may thus provide new/different views of the scenes captured within the distance-lapse video.

For example, the processor 310 may use the location information/location of the image capture device 302 to determine how far the image capture device 302 has moved. Every time the image capture device 302 moves a threshold distance amount (distance interval), the processor 310 may generate a video frame for a distance-lapse video based on the visual content captured by the image sensor 306. For example, every time the image capture device 302 moves a threshold distance amount, the processor 310 may use the image sensor 306 to capture the visual content for use in a video frame of the distance-lapse video. As another example, the image sensor 306 may be used to continuously/periodically capture visual content, and which of the captured visual content will be used to generate the video frames of the distance-lapse video may be determined based on moments at which the image capture device moved a threshold distance amount.

Referring back to FIG. 1, the processor 11 (or one or more components of the processor 11) may be configured to obtain information to facilitate generating videos using traveled distance. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, a location sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate generating videos using traveled distance. The machine-readable instructions 100 may include one or more computer program components. The machine-readable instructions 100 may include one or more of a distance component 102, a distance criterion component 104, a generation component 106, and/or other computer program components.

The distance component 102 may be configured to determine a distance traveled by the image capture device. Determining the distance traveled by the image capture device may include ascertaining, approximating, calculating, estimating, finding, identifying, obtaining, quantifying, and/or otherwise determining the distance traveled by the image capture device. Determining a distance traveled by the image capture device may include determining the distance traveled by the image capture device over a duration of time. The distance travel by the image capture device between two or moments in the capture duration may be determined.

The distance traveled by the image capture device may be determined based on the location information and/or other information. The distance traveled by the image capture device may be determined based on the locations of the image capture device characterized by the location information and/or other information. The distance traveled by the image capture device may be determined based on the locations of the image capture device at different moments within the capture duration.

A distance traveled by the image capture device may refer to an amount of space traveled by the image capture device. The distance traveled by the image capture device may include a change in latitude and/or longitude of the image capture device between two or more moments within the capture duration. The distance traveled by the image capture device may further include a change in elevation of the image capture device between two or more moments within the capture duration.

A distance traveled by the image capture device include the distance traveled by the image capture device between the current moment in the capture duration and the last moment in the capture duration at which the video frame was generated. For example, the location of the image capture device may be tracked to see how far the image capture device has traveled since the last video frame of the distance-lapse video was generated. The location of the image capture device may be tracked to measure distance traveled by the image capture device between the last location at which the video frame of the distance-lapse video was generated and the current location of the image capture device. Such determination of the distance traveled by the image capture device may enable video frames of the distance-lapse video to be generated whenever the image capture device has traveled a certain amount of distance since the last video frame generation. For instance, every time the image capture device moves 10 meters, a video frames of the distance-lapse video may be generated. When a video frame is generated, the location corresponding to the video frame may be set as the last location of the image capture device, and the distance traveled by the image capture device from the last location may be determined.

A distance traveled by the image capture device include the distance traveled by the image capture device between the current moment in the capture duration and a starting moment in the capture duration. For example, the location of the image capture device may be tracked to see how far the image capture device has traveled since the capture of the distance-lapse video was started. The location of the image capture device may be tracked to measure distance between the starting location of the image capture device for the distance-lapse video and the current location of the image capture device. Such determination of the distance traveled by the image capture device may enable video frames of the distance-lapse video to be generated as the image capture device moves away from an originating location. For instance, every time the image capture device moves 10 meters away from the originating location, a video frames of the distance-lapse video may be generated.

A distance traveled by the image capture device include the distance traveled by the image capture device between the current moment in the capture duration and any moment in the capture duration in which a video frame was generated. For example, the location of the image capture device may be tracked to see how far the image capture device has traveled since any video frames of the distance-lapse video were generated. The location of the image capture device may be tracked to measure distance traveled by the image capture device between all locations at which video frames of the distance-lapse video were generated and the current location of the image capture device. Such determination of the distance traveled by the image capture device may enable video frames of the distance-lapse video to be generated whenever the image capture device has traveled a certain amount of distance from all locations at which video frames were generated. For instance, for photogrammetry or surveying, it may be desirable to reduce/prevent capture of video frames from the same location. Distance between the current location of the image capture device and any locations at which video frames have been captured may be used to generate video frames from unique locations in 2D or 3D space. For example, the image capture device may generate a video frame when it is at least 10 meters away from all locations at which the image capture device has previously generated video frames. If the image capture device is within 10 meters of any location in which the image capture device has previously generated video frames, a new video frame may not be generated.

In some implementations, a distance traveled by the image capture device include difference between locations of the image capture device at different moments. For example, determination of the distance traveled by the image capture device based on the location information may include: (1) determination of a first location of the image capture device based on the location of the image capture device characterized by the location information at a first moment and/or other information; (2) determination of a second location of the image capture device based on the location of the image capture device characterized by the location information at a second moment and/or other information; and (3) determination of the distance traveled by the image capture device based on a difference between the first location of the image capture device and the second location of the image capture device and/or other information.

Figure 4A:
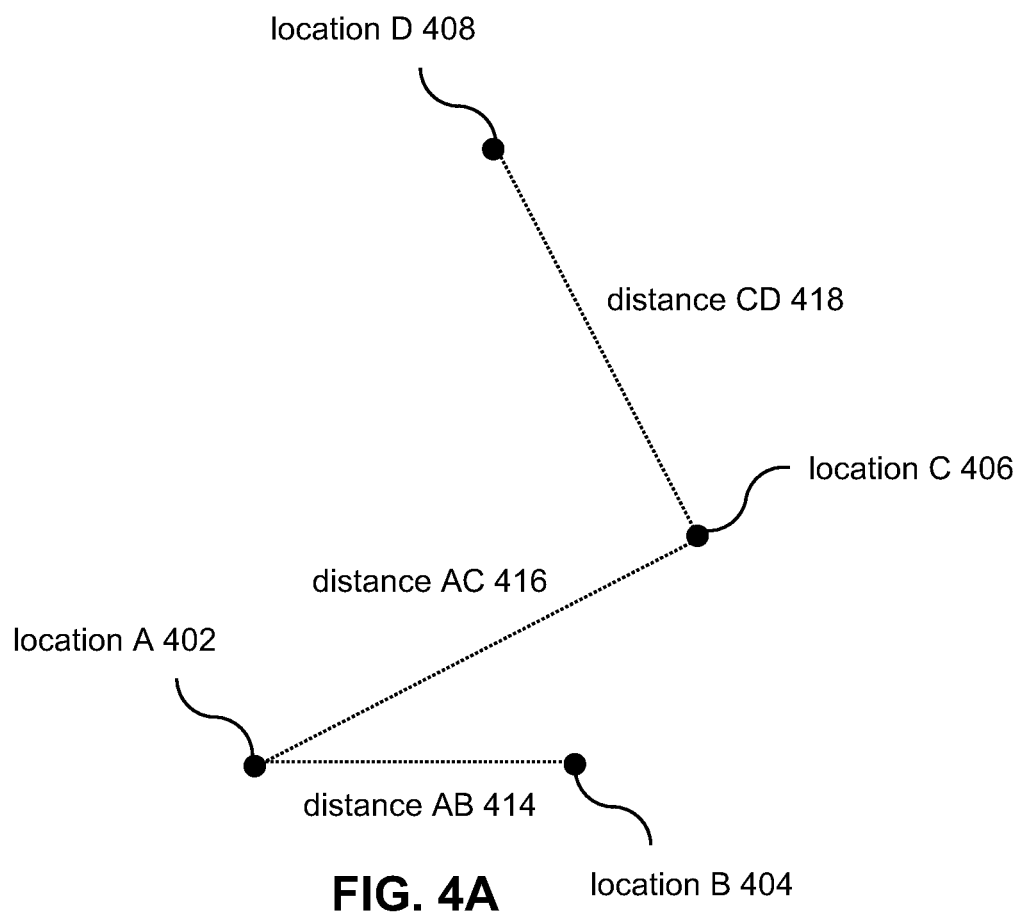
FIG. 4A illustrates example distances traveled by an image capture device.

FIG. 4A illustrates example distances traveled by an image capture device. In the beginning of the capture duration, the image capture device may be at location A 402. The image capture device may be moved from the location A 402 to location B 404. The image capture device may be moved from the location B 404 to location C 406. The image capture device may be moved from location C 406 to location D 408.

The locations 402, 404, 406, 408 of the image capture device at different moments within the capture duration may be determined based on the locations of the image capture device characterized by the location information. The distances traveled by the image capture device may include distance AB 414 between the location A 402 and the location B 404, distance AC 416 between the location A 402 and the location C 406, distance CD 418 between the location C 406 and the location D 408, and/or other distances. The distance AB 414 may be determined based on the difference between the location A 402 and the location B 404. The distance AC 416 may be determined based on the difference between the location A 402 and the location C 406. The distance CD 418 may be determined based on the difference between the location C 406 and the location D 408.

In some implementations, a distance traveled by the image capture device include the path (way, track) traveled by the image capture device between different moments. Different locations of the image capture device between different moments may be used to determine how/where the image capture device moved between the different moments. For example, determination of the distance traveled by the image capture device based on the location information may include: (1) determination of a path traveled by the image capture device over a capture duration based on the location of the image capture device characterized by the location information at multiple moments within the capture duration and/or other information; and (2) determination of the distance traveled by the image capture device based on the path traveled by the image capture device and/or other information.

Figure 4B:
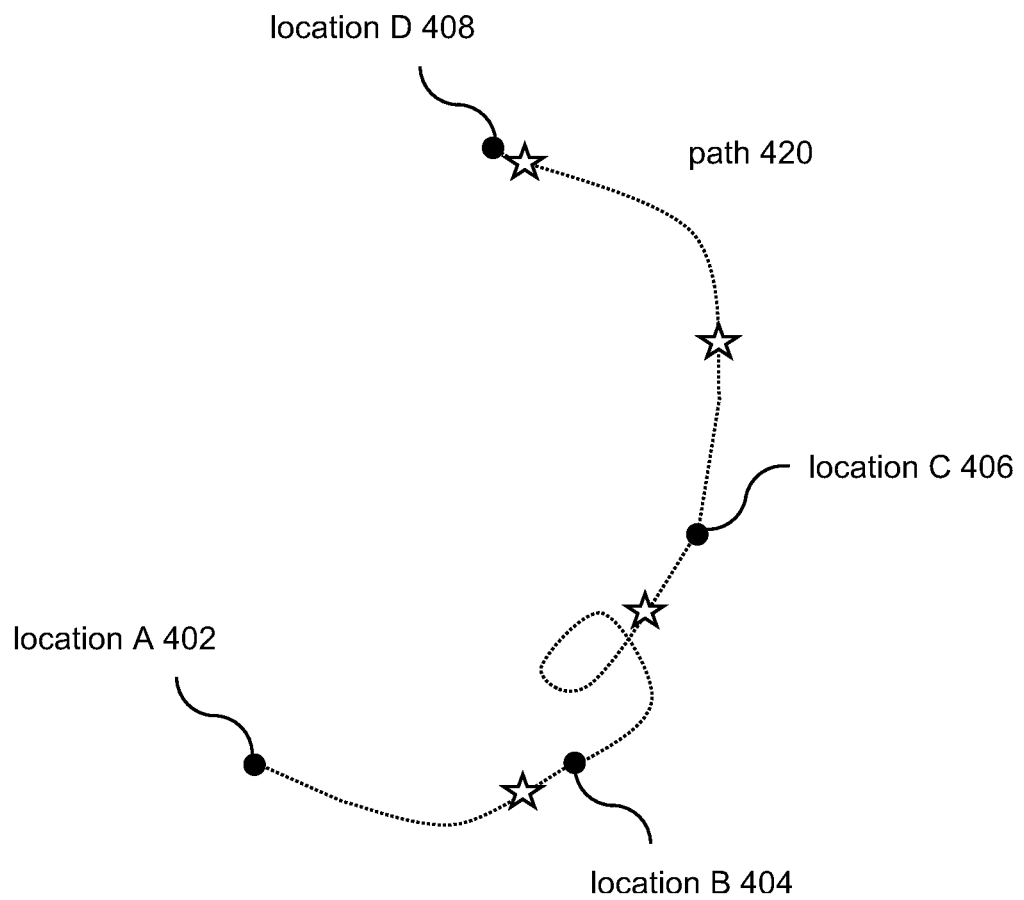
FIG. 4B illustrates an example path traveled by an image capture device.

FIG. 4B illustrates an example path 420 traveled by an image capture device. As shown in FIG. 4B, the image capture device may not have moved in straight lines between the locations 402, 404, 406, 408. Between the location A 402 and the location D 408, the image capture device may have moved over the path 420. The path 420 may be determined by tracking where the image capture device was located at different moments, including where the image capture device was located as it moved from the location A 402 and the location B 404, from the location B 404 to the location C 406, and from the location C 406 to the location D 408. The distance traveled by the image capture device may be determined to be same as the path 420. The distance traveled by the image capture device may be determined to be the length of the path 420.

In some implementations, the distance traveled by the image capture device may be determined based on both (1) the distance traveled by the image capture device include difference between locations of the image capture device at two moments, and (2) the path traveled by the image capture device between two moments. For example, both the shortest distance between locations of the image capture device at two moments and how the image capture device moved between the two moments may be used to determine the distance traveled by the image capture device.

The distance criterion component 104 may be configured to determine whether the distance traveled by the image capture device satisfies one or more distance criteria. Determine whether the distance traveled by the image capture device satisfies a distance criterion may include ascertaining, calculating, establishing, finding, identifying, and/or otherwise determining whether the distance traveled by the image capture device satisfies the distance criterion. A distance criterion may refer to one or more standards, factors, and/or principles by which the distance traveled by the image capture device is analyzed, judged, measured, and/or otherwise decided on for potential generation of video frames of a distance-lapse video. A distance criterion may provide one or more standards, factors, and/or principles relating to distance to determine whether a video frame of a distance-lapse video should be generated. A distance criterion may define a distance interval used to generate the video frames of the distance-lapse video. A distance criterion may be satisfied based on the distance traveled by the image capture device meeting, being the same as, exceeding, and/or otherwise satisfying the distance criterion.

In some implementations, a distance criterion may define one or more distance thresholds. The distance criterion may be satisfied based on the distance traveled by the image capture device being the same as or being greater than the distance threshold(s). For example, the distance criterion may define a distance that must be traveled by the image capture device for a video frame of the distance-lapse video to be generated.

In some implementations, the distance required by the distance criterion may be compared with the distance traveled by the image capture device between the current moment in the capture duration and the last moment in the capture duration at which a video frame of the distance-lapse video was generated. For example, distance required by the distance criterion may be 10 meters, and the distance criterion may be satisfied based on the image capture device moving 10 meters (or more) away from the last location at which the video frame was generated.

In some implementations, the distance required by the distance criterion may be compared with the distance traveled by the image capture device between the current moment in the capture duration and a starting moment in the capture duration. For example, distance required by the distance criterion may increase by 10 meters every time a video frame is generated. The distance criterion may be satisfied based on the image capture device moving 10 meters away from the starting location, then moving 20 meters away from the starting location, and so forth.

In some implementations, a distance criterion may be set based on one or more of user input, environment, system default, and/or other information. For example, a user may select/specify the amount of distance that must be traveled by the image capture device to trigger generation of a video frame. The system 10 and/or one or more image capture devices capturing the distance-lapse video may be operating within a certain mode, which may specify the amount of distance that must be traveled by the image capture device to trigger generation of a video frame. Different environments in which the image capture device is operating may be associated with different amounts of distance that must be traveled by the image capture device to trigger generation of a video frame (e.g., different distance thresholds for indoor, city, forest, hiking path, highway).

In some implementations, a distance criterion may include a criterion for the change in latitude and/or longitude of the image capture device, a separate criterion for the change in elevation of the image capture device, and/or other criteria. The distance criterion may include separate criteria for lateral movement and vertical movement of the image capture device.

In some implementations, a distance criterion may include a criterion for difference between locations of the image capture device, a separate criterion for the path traveled by the image capture device, and/or other criteria. The distance criterion may include separate criterial for the difference between locations of the image capture device at different moments (e.g., straight line distance) and for the path traveled by the image capture device between those locations.

In some implementations, video frame generation may be triggered based on one or more of the criteria being satisfied. In some implementations, video frame generation may be triggered based on all of the criteria being satisfied.

In some implementations, a distance criterion may change based on generation of video frames of the distance-lapse video. For example, the amount of distance that must be traveled by the image capture device to trigger video frame generation may change based on actual distance traveled by the image capture device between generation of video frames. The distance criterion may be changed to avoid accumulation of error in generating video frames. For example, a distance criterion may require the image capture device to generate a video frame for every 10 meters of travel. Last video frame may have been generated after the image capture device traveled 11 meters from the prior location. To compensate for the difference in the distance required by the distance criterion and the actual travel distance, the distance criterion for the next video frame may be changed (e.g., reduced from 10 meters to 9 meters). Other changes in the distance criterion are contemplated.

The generation component 106 may be configured to, responsive to determination that the distance traveled by the image capture device satisfies one or more distance criteria, generate one or more video frames of a distance-lapse video based on the visual content and/or other information. A video frame of a distance-lapse video may be referred to as a distance-lapse video frame. A video frame of the distance-lapse video may be generated based on the visual content captured by the image capture device at moments when one or more distance criteria are satisfied. The satisfaction of a distance criteria may be used to determine which visual content will be captured and/or which of the captured visual content will be used to generate the video frames of the distance-lapse video.

For example, referring to FIG. 4A, the image capture device may generate a video frame at the location A 402. The image capture device may move to be located at the location B 404. The distance AB 414 may not satisfy a distance criterion, and the image capture device may not generate a video frame at the location B 404. The image capture device may move to be located at the location C 406. The distance AC 416 may satisfy the distance criterion, and the image capture device may generate a video frame at the location C 406. The image capture device may move to be located at the location D 308. The distance CD 418 (the distance between the current location and the last location at which a video frame was generated) may satisfy the distance criterion, and the image capture device may generate a video frame at the location D 408.

Referring to FIG. 4B, the image capture device may generate a video frame at the location A 402. The image capture device may move along the path 420, which moves the image capture device from the location A 402, to the location B 404, to the location C 406, and to the location D 408. The distance criterion may be satisfied at different locations along the path 402. The distance criterion may be satisfied based on the path length traveled by the imaged capture device from the last location of video frame generation being the same as or greater than the distance threshold. The imaged capture device may generate video frames for a distance-lapse video at these locations at which the distance criterion is satisfied. These locations may be marked with stars. For example, the image capture device may generate a video frame before reaching the location B 404, a video frame before reaching the location C 406, two video frames between the location C 406 and the location D 408.

In some implementations, generation of a video frame of the distance-lapse video may include capture of the video frame for inclusion in the distance-lapse video. When the image capture device captures visual content for use in generating distance-lapse video frames may be determined based on satisfaction of the distance criterion. The rate at which visual content is captured by the image capture device may change based on the speed with which the image capture device moves during the capture duration.

In some implementations, generation of a video frame of the distance-lapse video may include selection of the video frame from captured video frames for inclusion in the distance-lapse video. The image capture device may capture video frames at one or more rates, and which of the captured video frames are selected for inclusion in the distance-lapse video may be determined based on satisfaction of the distance criterion. For example, the image capture device may capture and store images in memory (e.g., in a buffer). When the distance criterion is satisfied, the image captured at the moment/location in which the distance criterion was satisfied may be selected for use in generating a distance-lapse video frame. For example, the image capture device may capture images at a certain rate, and the satisfaction of the distance criterion may be used to select some or all of the captured images for inclusion as distance-lapse video frames in the distance-lapse video.

Figure 5:
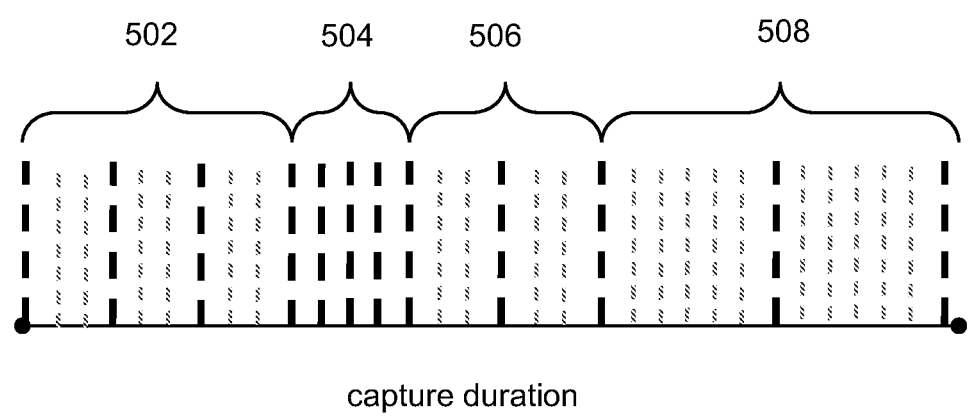
FIG. 5 illustrates example generation of video frames of a distance-lapse video.

FIG. 5 illustrates example generation of video frames of a distance-lapse video. FIG. 5 may show thirty-two equally-spaced apart moments within a capture duration. Use of a particular time-lapse video frame rate may result in a video frame being generated at every moment shown in FIG. 5. Rather than using passage of time, distance-lapse video frames may be generated at moments within the capture duration when a distance criterion is satisfied. Use of the distance criterion to generate distance-lapse video frames may result in the rate of distance-lapse video generation being controlled by how fast the image capture device is moving. The rate of distance-lapse video generation may increase when the image capture device travels at a faster rate and the rate of distance-lapse video generation may decrease when the image capture device travels at a slower rate. In FIG. 5, moments at which distance-lapse video frames are generated are shown as bolded, dashed-lined.

For example, based on a steady movement of the image capture device, three distance-lapse video frames may be generated for a segment 502 of the capture duration. In a segment 504 of the capture duration, the speed of movement of the image capture device may increase, resulting in a greater rate of distance-lapse video frame generation. In a segment 506 of the capture duration, the speed of movement of the image capture device may revert back to the original speed, resulting the rate of distance-lapse video frame generation being the same as the segment 502 of the capture duration. In a segment 508 of the capture duration, the speed of movement of the image capture device may decreased, resulting in a slower rate of distanced-lapse video frame generation. Other generation of distance-lapse video frames are contemplated.

In some implementations, the video frames may be stabilized based on a punchout of the visual content and/or other information. Rather than using the entire visual content captured by the image capture device, one or more portions of the visual content may be punched out (using a viewing window) to provide stabilization of the visual content within the video frames. Stabilization of visual content may be performed based on placement of the viewing window within the field of view of the visual content. Stabilization of visual content may include using smaller spatial extents of the visual content to provide a punchout view of the visual content that creates a more stable view than when viewing the entirety of the visual content.

A punchout of the visual content may refer to an output of one or more portions of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial extents of the visual content. Inclusion of the extent(s) of the visual content within the punchout/viewing window may effectuate stabilization of the visual content via selective cropping.

The placement of the viewing window may compensate for the motion (e.g., unintentional motion) of the image capture device during the capture duration. The placement of the viewing window may reduce, remove, and/or smooth the motion present in the visual content due to different translational and/or rotational positions of the image capture device when it captured the visual content. For example, a viewing window having a smaller size than the field of view of the visual content may be used to provide a punchout of the visual content. The punchout (cropped view) may be moved within the field of view to provide a stabilized view of the visual content.

The viewing window may be oriented with respect to the field of view of the visual content to provide a punchout of the visual content that is stable/smooth with respect to prior and/or next punchout of the visual content. For example, the viewing window may be oriented with respect to the field of view of images captured by the image capture device to provide a punchout of the images such that the visual content within the viewing window appears to have been captured with a stable/more stable image capture device (e.g., a punchout of a video frame being stable/more stable with a punchout of the preceding video frame and/or a subsequent video frame). The viewing window may be oriented with respect to the field of view of the visual content based on movement of the viewing window and/or movement of the field of view (e.g., movement of visual content in image space).

The distance-lapse video may be generated to include the video frames. The distance-lapse video may be defined by distance-lapse video information. Distance-lapse video information defining a distance-lapse video may define an encoded version/copy of the distance-lapse video frames/distance-lapse video and/or instructions for rendering the distance-lapse video frames/distance-lapse video. For example, the distance-lapse video information may define an encoded version/copy of the distance-lapse video frames/distance-lapse video, and the distance-lapse video information (e.g., distance-lapse video file) may be opened in a video player for presentation of the distance-lapse video frames/distance-lapse video. The distance-lapse video information may define instructions to render the distance-lapse video frames/distance-lapse video for presentation. For example, the distance-lapse video information may define a director track that includes information as to which images and/or which visual portions of the images should be included within a presentation as distance-lapse video frames/distance-lapse video. A video player may use the director track to retrieve the relevant images/relative visual portions of the images when the distance-lapse video is opened/to be presented.

The generation component 106 may be configured effectuate storage of the distance-lapse video information and/or other information in one or more storage media. For example, the distance-lapse video information may be stored in the electronic storage 13, remote storage locations (storage media located at/accessible through a server), and/or other locations. In some implementations, the generation component 106 may effectuate storage of the distance-lapse video information through one or more intermediary devices. For example, the processor 11 may be located within a computing device without a connection to the storage device (e.g., the computing device lacks Wi-Fi/cellular connection to the storage device). The generation component 106 may effectuate storage of the distance-lapse video information through another device that has the necessary connection (e.g., the computing device using a Wi-Fi/cellular connection of a paired mobile device, such as a smartphone, tablet, laptop, to store information in one or more storage media). Other storage locations for and storage of the distance-lapse video information are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, the image sensor 15, and the location sensor 16 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
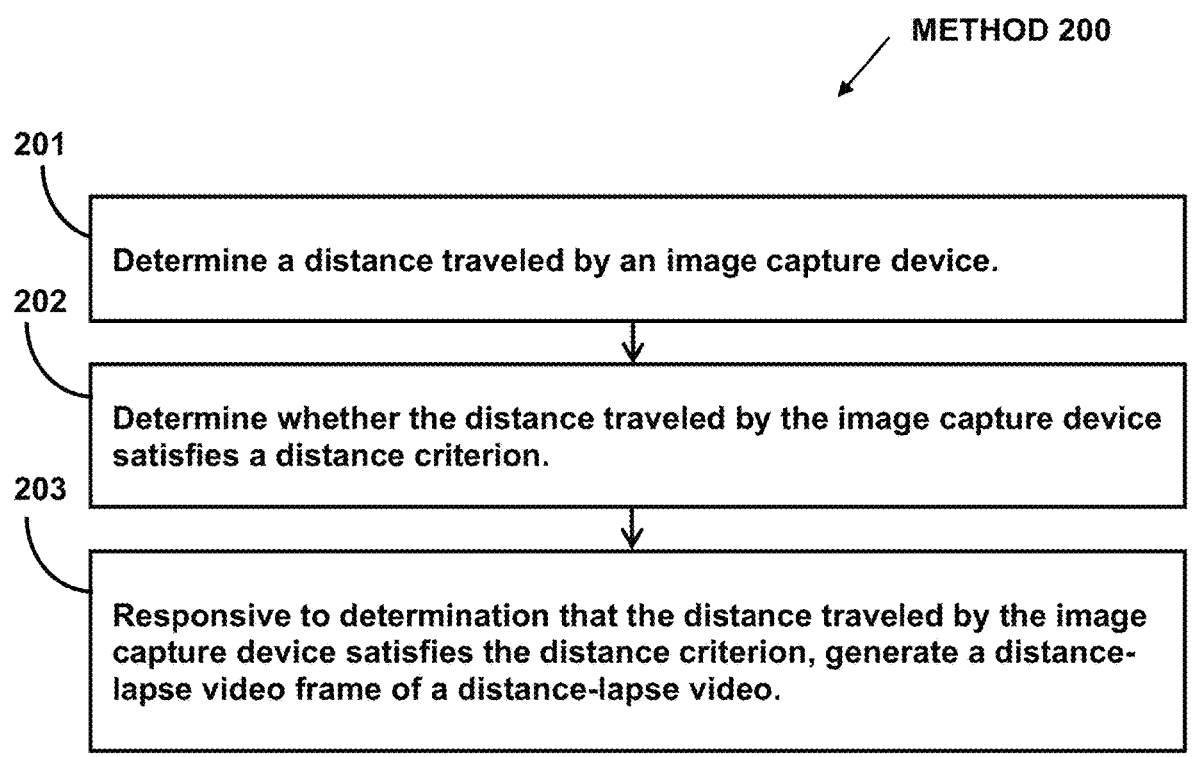
FIG. 2 illustrates an example method for generating videos using traveled distance.

FIG. 2 illustrates method 200 for generating videos using traveled distance. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an image sensor, an optical element, a location sensor, and/or other components. The optical element may guide light within a field of view to the image sensor. The image sensor may generate a visual output signal conveying visual information based on light that becomes incident thereon. The visual information may define visual content. The location sensor may generate a location output signal conveying location information. The location information may characterize location of the image capture device.

At operation 201, a distance traveled by the image capture device may be determined based on the location information and/or other information. In some implementation, operation 201 may be performed by a processor component the same as or similar to the distance component 102 (Shown in FIG. 1 and described herein).

At operation 202, whether the distance traveled by the image capture device satisfies a distance criterion may be determined. In some implementations, operation 202 may be performed by a processor component the same as or similar to the distance criterion component 104 (Shown in FIG. 1 and described herein).

At operation 203, responsive to determination that the distance traveled by the image capture device satisfies the distance criterion, a video frame of a distance-lapse video may be generated based on the visual content and/or other information. In some implementations, operation 203 may be performed by a processor component the same as or similar to the generation component 106 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for generating videos using traveled distance, the image capture device comprising:
   a housing;
   an image sensor carried by the housing and configured to generate a visual output signal conveying visual information based on light that becomes incident thereon, the visual information defining visual content;
   an optical element carried by the housing and configured to guide light within a field of view to the image sensor;
   a location sensor carried by the housing and configured to generate a location output signal conveying location information, the location information characterizing location of the housing; and
   one or more physical processors carried by the housing, the one or more physical processors configured by machine-readable instructions to:
      determine a distance traveled by the housing based on the location information, the distance traveled by the housing including a change in latitude and/or longitude of the housing, wherein determination of the distance traveled by the housing based on the location information includes:
         determination of a path traveled by the housing over a capture duration based on the location of the housing characterized by the location information at multiple moments within the capture duration; and
         determination of the distance traveled by the housing based on the path traveled by the housing;
      determine whether the distance traveled by the housing satisfies a distance criterion; and
      responsive to determination that the distance traveled by the housing satisfies the distance criterion, generate a video frame of a distance-lapse video based on the visual content, wherein generation of the video frame of the distance-lapse video includes capture of the video frame for inclusion in the distance-lapse video or selection of the video frame from captured video frames for inclusion in the distance-lapse video.

2. The image capture device of claim 1, wherein determination of the distance traveled by the housing based on the location information further includes:

determination of a first location of the housing based on the location of the housing characterized by the location information at a first moment, determination of a second location of the housing based on the location of the housing characterized by the location information at a second moment, and determination of the distance traveled by the housing further based on a difference between the first location of the housing and the second location of the housing.

3. The image capture device of claim 1, wherein the location information characterizes the location of the housing by including information that specifies the longitude and the latitude of the housing.

4. The image capture device of claim 3, wherein the location information characterizes the location of the housing by further including information that specifies elevation of the housing.

5. An image capture device for generating videos using traveled distance, the image capture device comprising:
a housing;
an image sensor carried by the housing and configured to generate a visual output signal conveying visual information based on light that becomes incident thereon, the visual information defining visual content;
an optical element carried by the housing and configured to guide light within a field of view to the image sensor;
a location sensor carried by the housing and configured to generate a location output signal conveying location information, the location information characterizing location of the housing; and
one or more physical processors carried by the housing, the one or more physical processors configured by machine-readable instructions to:
determine a distance traveled by the housing based on the location information, wherein determination of the distance traveled by the housing based on the location information includes:
determination of a path traveled by the housing over a capture duration based on the location of the housing characterized by the location information at multiple moments within the capture duration; and
determination of the distance traveled by the housing based on the path traveled by the housing;
determine whether the distance traveled by the housing satisfies a distance criterion; and
responsive to determination that the distance traveled by the housing satisfies the distance criterion, generate a video frame of a distance-lapse video based on the visual content.

6. The image capture device of claim 5, wherein the location sensor includes a GPS sensor.

7. The image capture device of claim 5, wherein the location information characterizes the location of the housing by including information that specifies longitude and latitude of the housing.

8. The image capture device of claim 7, wherein the location information characterizes the location of the housing by further including information that specifies elevation of the housing.

9. The image capture device of claim 8, wherein the distance criterion includes a first criterion for a change in the latitude and/or the longitude of the housing and a second criterion for a change in the elevation of the housing.

10. The image capture device of claim 5, wherein determination of the distance traveled by the housing based on the location information further includes:
determination of a first location of the housing based on the location of the housing characterized by the location information at a first moment;
determination of a second location of the housing based on the location of the housing characterized by the location information at a second moment; and
determination of the distance traveled by the housing further based on a difference between the first location of the housing and the second location of the housing.

11. The image capture device of claim 5, wherein generation of the video frame of the distance-lapse video includes capture of the video frame for inclusion in the distance-lapse video.

12. The image capture device of claim 5, wherein generation of the video frame of the distance-lapse video includes selection of the video frame from captured video frames for inclusion in the distance-lapse video.

13. A method for generating videos using traveled distance, the method performed by an image capture device including one or more processors, an image sensor configured to generate a visual output signal conveying visual information based on light that becomes incident thereon, the visual information defining visual content, an optical element configured to guide light within a field of view to the image sensor, a location sensor configured to generate a location output signal conveying location information, and the location information characterizing location of the image capture device, the method comprising:
determining, by the image capture device, a distance traveled by the image capture device based on the location information, wherein determining the distance traveled by the image capture device based on the location information includes:
determining a path traveled by the image capture device over a capture duration based on the location of the image capture device characterized by the location information at multiple moments within the capture duration; and
determining the distance traveled by the image capture device based on the path traveled by the image capture device;
determining whether the distance traveled by the image capture device satisfies a distance criterion; and
responsive to determination that the distance traveled by the image capture device satisfies the distance criterion, generating a video frame of a distance-lapse video based on the visual content.

14. The method of claim 13, wherein the location information characterizes the location of the image capture device by including information that specifies longitude and latitude of the image capture device.

15. The method of claim 14, wherein the location information characterizes the location of the image capture device by further including information that specifies elevation of the image capture device.

16. The method of claim 15, wherein the distance criterion includes a first criterion for a change in the latitude and/or the longitude of the image capture device and a second criterion for a change in the elevation of the image capture device.

17. The method of claim 13, wherein determining the distance traveled by the image capture device based on the location information further includes:
- determining a first location of the image capture device based on the location of the image capture device characterized by the location information at a first moment;
- determining a second location of the image capture device based on the location of the image capture device characterized by the location information at a second moment; and
- determining the distance traveled by the image capture device further based on a difference between the first location of the image capture device and the second location of the image capture device.

18. The method of claim 13, wherein the location sensor includes a GPS sensor.

19. The method of claim 13, wherein generating the video frame of the distance-lapse video includes capturing the video frame for inclusion in the distance-lapse video.

20. The method of claim 13, wherein generating the video frame of the distance-lapse video includes selecting the video frame from captured video frames for inclusion in the distance-lapse video.

* * * * *